United States Patent [19]
Amos et al.

[11] Patent Number: 5,746,579
[45] Date of Patent: May 5, 1998

[54] STRESS CORROSION RESISTANT RIMS AND DISCS FOR STEAM TURBINE ROTORS DEVICE AND METHOD

[75] Inventors: Dennis Ray Amos, Rock Hill, S.C.; Sallie Ann Bachman, Oviedo; Jianqiang Chen, Winter Springs, both of Fla.

[73] Assignee: Westinghouse Electric Corporation, Pittsburgh, Pa.

[21] Appl. No.: 775,075

[22] Filed: Dec. 27, 1996

[51] Int. Cl.[6] .................................................. F04D 29/34
[52] U.S. Cl. ........................................ 416/204 A; 415/200
[58] Field of Search .......................... 416/204 R, 204 A, 416/213 R; 415/200

[56] References Cited

U.S. PATENT DOCUMENTS

| | | | |
|---|---|---|---|
| 2,440,069 | 4/1948 | Bloomberg | 60/41 |
| 2,918,253 | 12/1959 | Mackey | 416/204 A |
| 3,165,342 | 1/1965 | Anderson | 416/204 A |
| 3,590,454 | 7/1971 | Braun | 29/156.8 R |
| 4,152,816 | 5/1979 | Ewing et al. | 29/156.8 R |
| 4,224,360 | 9/1980 | Ohnishi et al. | 427/239 |
| 4,633,554 | 1/1987 | Clark et al. | 29/156.4 R |
| 4,697,987 | 10/1987 | Katayama et al. | 416/204 A |
| 4,893,388 | 1/1990 | Amos et al. | 29/156.8 B |
| 4,897,519 | 1/1990 | Clark et al. | 219/76.14 |
| 5,024,582 | 6/1991 | Bellows et al. | 416/213 R |
| 5,609,471 | 3/1997 | Frasier et al. | 416/204 A |

FOREIGN PATENT DOCUMENTS

62-113804   5/1987   Japan .

OTHER PUBLICATIONS

Clark, R.E. et al., "Experiences with Weld Repair of Low Pressure Steam Turbine Rotors", 47th Annual Meeting of the American Power Conference, Apr. 22–24, 1985, Chicago, Illinois.

Clark, R.E. et al., "Development of the Techniques for High Pressure Rotor Weld Repair", Westinghouse Electric Corp. and Mitsubishi Heavy Industries, Ltd. Technical Seminar, Takasago, Japan, Jul. 20–22, 1987.

Milliken, C.K. et al., "Qualification Welding of 12% Chromium Segemental Vanes", Westinghouse Electric Corporation Steam Turbine –Generator Division, The Quadranagle, Orlando, FL, Technical Report TR–85039, Apr. 1, 1985.

Morin, M. and Stoeckli, "Complex Submerged Arc Weld Repairs of Large Rotating Equipment", 1994 EPRI International Conference, Mar. 23–25, 1994, Williamsburg, Virginia.

Phillips, A., ed., "Introductory Welding Metallurgy", American Welding Society, New York, 1968, pp. 118–122.

Schubert, D. et al., "Weld Repair of Geothermal Turbine Rotors a Partnering Approach", *Geothermal Resources Council Transactions* 1992, 16, 567–574.

*Sermatech Review* 1989, No. 31, pp. 1–2, "New Services for Industrial Turbines".

*Metals Handbook*, vol. 6, "Welding, Brazing and Soldering", 9th Edition ASM (1983).

US Patent Application, "High Chromium Content Welding Material to Improve Resistance of Corrosion Method and Device", serial No. 08/668,791, filed Jun. 24, 1996, attorney docket No. WE #58,608.

Coulon, P.A. "A Positive Experience with Large Stam Turbine Rotors Weld Repair", ASME–ASM Conference, Salt Lake City, 1985.

*Primary Examiner*—John T. Kwon

[57] ABSTRACT

A formed disc for use in a low pressure rotor has a rim made of a high alloy metal of between approximately 9% and 17% chromium. The rim can be annular in shape and slide onto the perimeter of an unformed disc for the two components to be fused together, thus fabricating a formed disc. Additionally, the rim can be split into a number of components and fused together on the perimeter of a rotor disc to form a complete rim. Further, an entire disc can be made out of the high alloy metal.

13 Claims, 2 Drawing Sheets

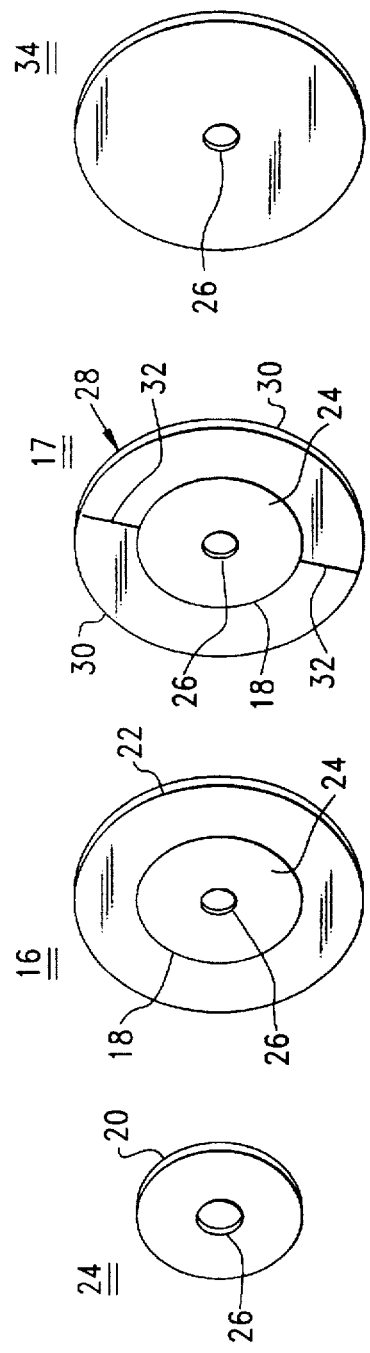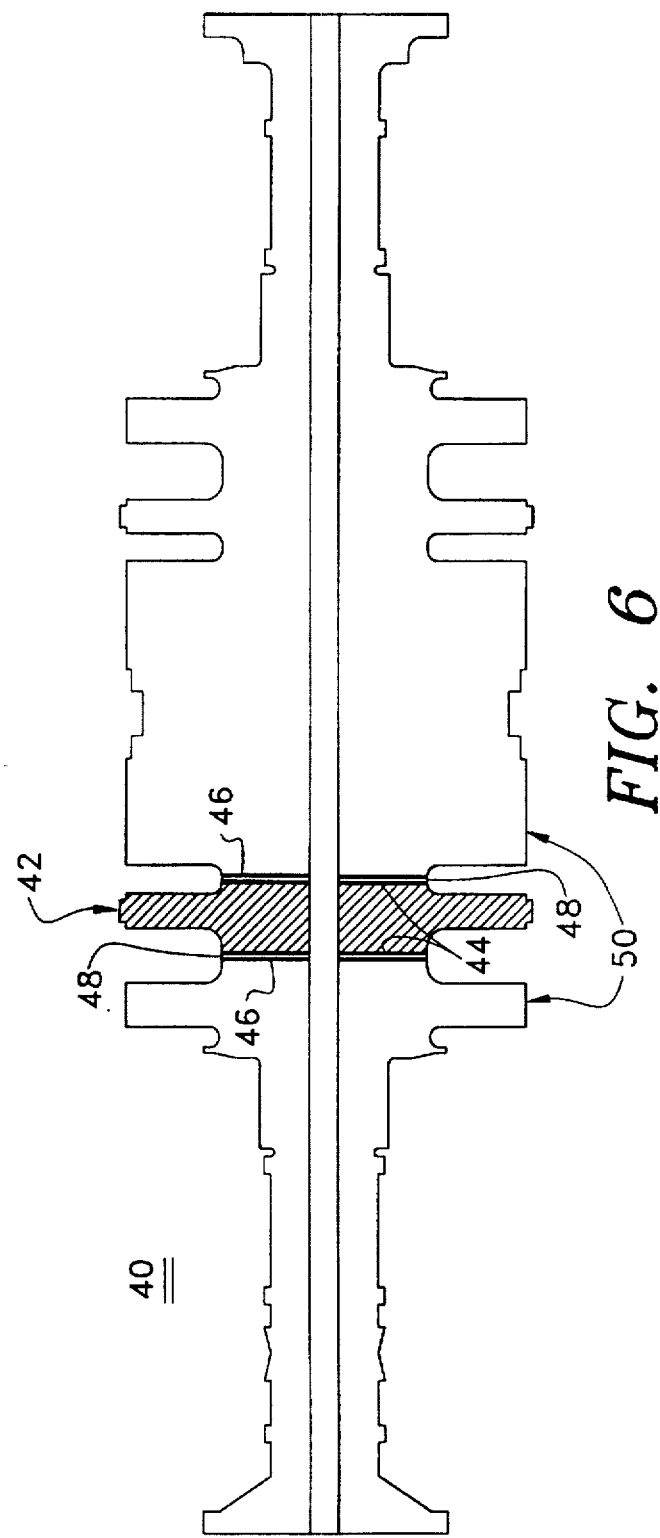

STRESS CORROSION RESISTANT RIMS AND DISCS FOR STEAM TURBINE ROTORS DEVICE AND METHOD

FIELD OF THE INVENTION

This invention relates to low pressure turbine components employed in steam turbine power plants, and more particularly, to methods of repairing and manufacturing steam turbine discs and rotors to extend their useful life.

BACKGROUND OF THE INVENTION

Low pressure steam turbines and rotors are usually constructed of low alloy steel and contain a number of projecting steeples disposed circumferentially about a disc portion of the rotor defining a rim. During service, these steeples can experience corrosion in a number of ways: the material of the rotor is susceptible to stress corrosion cracking, corrosion, and erosion corrosion; the environment in low pressure steam turbines, with all of its steam borne corroding components, promotes corrosion; and corrosion cracking induced by a combination of electrochemical corrosion, applied static or cyclic loading, and hard particle erosion. These damage mechanisms evidence themselves by pitting and cracking of the steeples and surrounding rim area, or substantial metal wastage, and can lead to scrapping the entire turbine rotor at great expense to the operator.

Incorporated by reference are Clark, et al., *Experiences with Weld Repair of Low Pressure Steam Turbine Rotors*, 47th American Power Conference, Apr. 22–24, 1985, Chicago, Ill. printed by Westinghouse Electric Corporation, Power Generation, Orlando, FLa.; commonly assigned U.S. Pat. Nos. 4,633,554; 4,893,388; 5,024,582; and commonly assigned U.S. patent application "High Chromium Content Welding Material to Improve Resistance of Corrosion Method and Device," Ser. No. 08/668,791, filed Jun. 24, 1996.

THe prior art methods of disc repair are labor intensive and may not be economically suitable for replacing entire rims of a rotor disc. It is clear that there is a need for an efficient method to replace entire rims on a steam turbine rotor. Additionally, it is clear that there is a need to provide rotors with rims possessing enhanced stress corrosion resistance. It is therefore desirable to provide a steam turbine disc with a rim that is resistant to stress corrosion and to provide steam turbine discs that are resistant to stress corrosion.

SUMMARY OF THE INVENTION

According to the invention, there is provided a formed disc for a low pressure steam turbine rotor comprised of a high alloy rim attached to an unformed disc. The use of the high alloy rim will extend the life of the rotor disc.

According to another aspect of the invention, the rim is comprised of multiple pieces.

According to an additional aspect of the invention, an entire solid disc is comprised of a high alloy.

According to an additional aspect of the invention, there is a method of attaching a high alloy rim to an unformed disc.

According to an additional aspect of the invention, there is a method of splicing a disc comprising at least a high alloy rim into a low pressure steam turbine rotor.

BRIEF DESCRIPTION OF THE DRAWINGS

FIG. 2 is a diagrammatic perspective view of an unformed disc for attachment to a rim as herein described;

FIG. 3 is a diagrammatic perspective view of a formed disc with a single piece high alloy rim welded to the perimeter surface of an unformed disc;

FIG. 4 is a diagrammatic perspective view of a formed disc with a two piece high alloy rim welded to the perimeter surface of an unformed disc;

FIG. 5 is a diagrammatic perspective view of a solid, high alloy disc without a separate rim component; and FIG. 6 is a cross-sectional view of a rotor illustrating a disc spliced into the rotor.

DETAILED DESCRIPTION OF THE PREFERRED EMBODIMENTS

Figure 1:
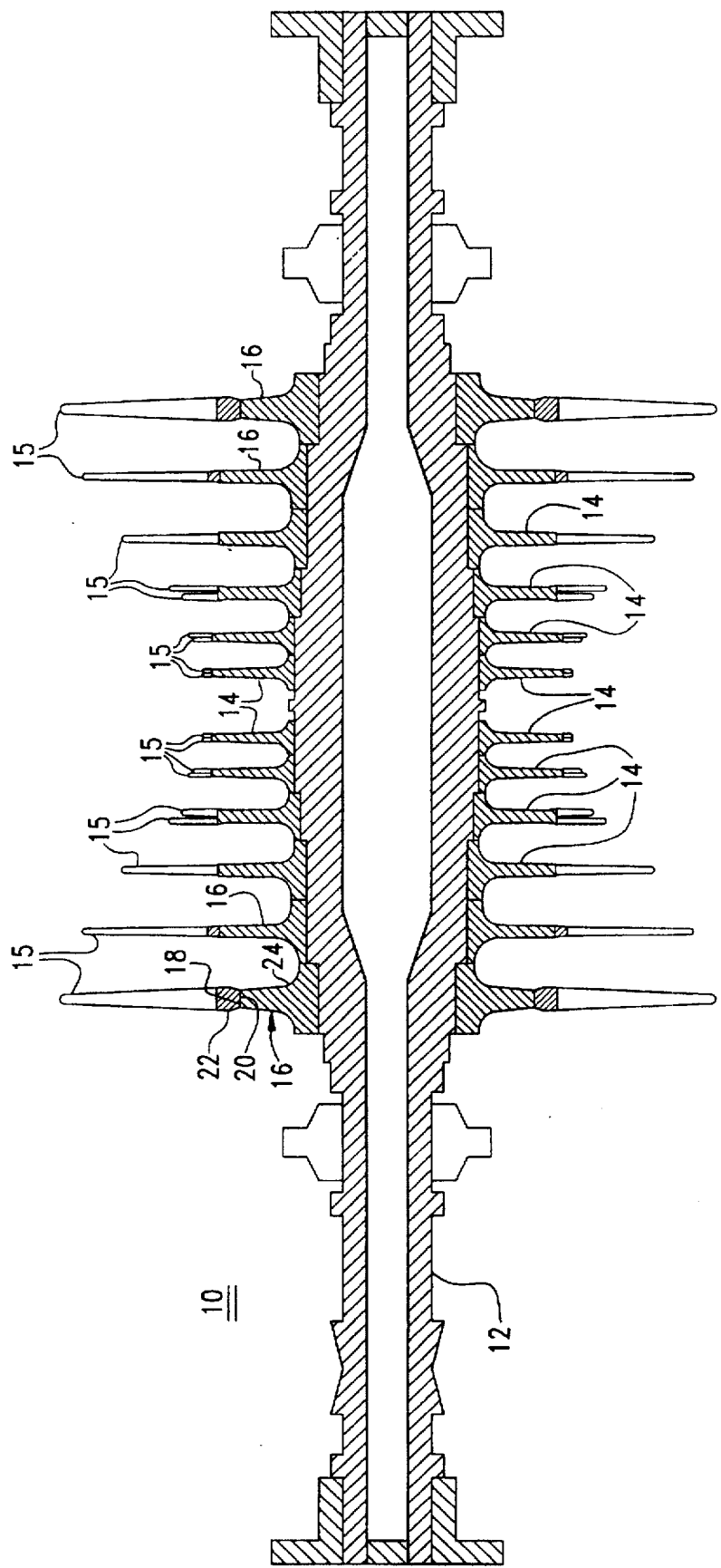
FIG. 1 is a cross-sectional view of a rotor illustrating discs on a shaft.

Referring now to FIG. 1, shown in cross-sectional view is a disc portion of a low pressure steam turbine rotor 10 comprised of a shaft 12 on which are mounted a plurality of discs 14, and formed discs 16. The discs 14 and formed discs 16 are coaxial with the axis of shaft 12. Shaft 12 extends through bore 26 of the discs (see FIG. 2). Discs 14 are made of a low alloy steel. Mounted to the periphery of discs 14 and formed discs 16 are blades 15 (shown diagrammatically). Blades 15 are typically mounted in grooves (not shown) that are machined into the periphery of a disc. During turbine operation, low pressure steam impinges on blades 15, causing rotor 10 to rotate.

Four formed discs 16, which is the preferred embodiment of the invention, are depicted on both the far right and far left of FIG. 1. Referring now to FIGS. 1, 2 and 3, formed disc 16 is comprised of an unformed disc 24 and rim 22. Unformed disc 24 is made preferably of a low alloy steel and rim 22 is made of a high alloy steel. Unformed disc 24 has a perimeter surface 20. Rim 22 is annular with an inside rim surface 18 attached to the perimeter surface 20 of disc 18. Rim 22 is a preferably forging.

The low alloy steel of the discs 14 and the unformed discs 24 has less than six weight percent alloying elements. The typical alloys which have been used previously in low pressure steam turbine rotors are summarized in Table I below.

TABLE I

Low Alloy Rotor Alloys

| Component | Generic Alloy Name | ASTM Identifications |
|---|---|---|
| LP Rotor | 2.5 NiMoV | A470, Class 2 |
| LP Rotor | 2.5 NiMoV | A470, Classes 3 & 4 |
| LP Rotor | 3.5 NiCrMoV | A470, Classes 5 to 7 |
| LP Disc | 3.5 NiCrMoV | A471, Classes 1 to 3 |
| LP Rotor | 2.0 NiMoV | A293, Classes 2 & 3 |
| LP Rotor | 2.5 NiMoV | A293, Classes 4 & 5 |
| LP Disc | 2.8 NiMoV | A294, Grades B & C |

The high alloy steel of rim 22 is a metal alloy having between approximately 9% and 17% chromium. It has been found that the lower boundary range of the chromium percentage, i.e., 9%, maintains corrosion resistance and achieves a desired transformation to martensite, which provides strength. It has been found that the upper boundary of the chromium range, i.e. 17%, ensures that the required combination of mechanical properties and corrosion resistance are achieved in an economical manner. Experimentation has shown that an approximately 12% chromium alloy yields the best results.

Besides chromium, rim 22 is also comprised of varying amounts of other alloy metals. To provide desired strength to meet design requirements of 55 to 80 kg/mm² yield strength in low pressure steam turbines, rim 22 can contain up to 0.25% vanadium, 2.5% molybdenum, and 0.5% tungsten. Too much of these alloy metals can result in undesirable low toughness. Nickel can be present up to 5.5% to increase toughness, but a greater amount increases the possibility of forming undesirable austenite. An amount of carbon ranging from 0.07% to 0.15% is needed for carbide formation. However, any greater amount increases the propensity for cracking, particularly during welding. Also, for every increase in the amount of carbon there is an undesirable corresponding increase in hardness and decrease in toughness. Further, increasing the amount of carbon requires raising post welding heat treatment temperatures, resulting in an undesirable decrease of rotor strength.

Any suitable process for affixing rim 22 to unformed disc 24 can be used. In the preferred embodiment, the components are fused together. Any suitable welding technique can be used to fuse the components, including narrow gap, gas metal arc, submerged arc, gas tungsten arc, laser beam and plasma arc welding techniques.

In a typical welding procedure for attaching rim 22 to unformed disc 24 to fabricate formed disc 16, the first step is to either machine down or flame cut off the old rim section not shown. Next, disc perimeter surface 20 is prepared by depositing a suitable amount of a suitable weld metal on it. Then, disc perimeter surface 20 and inside rim surface 18 are machined to ensure a proper welding surface. Next, rim 22 is slid into position on to disc perimeter surface 20 and the rim and unformed disc are welded together. Then, the welds are inspected and any necessary re-welding and stress relieving is performed. Finally, the formed disc 16 is machined to its final form.

In FIG. 4, an embodiment of the invention with a split rim 28, made up of two rim halves 30, forms split rim formed disc 17. The invention allows for the use of a rim made up of multiple pieces. This embodiment comprises two rim halves 30 and unformed disc 24. Each rim half 30 is a 180° component of a complete 360° rim. Two rim halves 30 are welded together, or attached in another appropriate manner, at split rim intersections 32 to form a complete 360° split rim 28. Split rim 28 can be used in place of rim 22 when a solid rim cannot be slid over the shaft and other discs to reach the unformed disc 24 to which the rim will be attached, or when it is expedient to use a multi-piece rim. The invention can also be practiced with more than two components to form a 360° split rim 28.

Referring now to FIG. 5, it is shown that the present invention can also be employed to form a solid disc 34 that has no separate rim component and that is constructed entirely of a high alloy metal. While making the solid disc 34 of a high alloy metal can be relatively expensive, there are certain advantages to this embodiment of the invention. For example, a pre-machined solid disc 34 made entirely of high alloy metal can resist corrosion more effectively. Typically, solid disc 34 is a forging.

Referring to FIG. 6, an alternative embodiment of the invention employs a rotor disc 42 spliced into a rotor 40. In the preferred embodiment, rotor disc 42 is comprised primarily of a high alloy metal, as in solid disc 34. In other embodiments, rotor disc 42 may be formed disc 16 or 17. Rotor disc 42 is mounted to rotor 40 by first cutting or burning out the disc to be replaced, thus leaving the two parts 50 of the original rotor. Then, side surfaces 44 of rotor disc 42 and inner surfaces 46 of rotor 40 are machined and otherwise prepared to match each other, respectively. Next, the corresponding surfaces 44 and 46 are attached, preferably by narrow groove weld 48. This aspect of the invention can also be used to assemble new rotors.

The present invention may be embodied in other specific forms without departing from the spirit or essential attributes thereof and, accordingly, reference should be made to the appended claims, rather than to the foregoing specification, as indicating the scope of the invention.

We claim:

1. A rim for a formed disc of a low pressure steam turbine rotor, the rim comprising an alloy having a chromium content between approximately 9% and 17%, the rim being attachable to a perimeter surface of an unformed disc.

2. The rim of claim 1, wherein the rim has at least one piece which forms an annulus.

3. The rim of claim 2, wherein the alloy has a chromium content of approximately 12%.

4. The rim of claim 2, wherein the rim is attached to the perimeter surface of the unformed disc.

5. The rim of claim 4, wherein the rim is fused to the perimeter surface of the unformed disc.

6. The rim of claim 4, wherein the formed disc is rotatable about an axis and is adapted to receive a co-axial shaft.

7. The rim of claim 6, wherein the shaft is mounted in a low pressure steam turbine.

8. The rim of claim 4, wherein the formed disc is spliced into a rotor for a low pressure steam turbine.

9. The rim of claim 8, wherein the rotor is mounted in the low pressure steam turbine.

10. A method of preparing a formed disc of a low pressure steam turbine rotor comprising the steps of:
disposing a rim about a perimeter surface of an unformed disc, the rim comprising an alloy having a chromium content between approximately 9% and 17%; and
affixing the rim to the perimeter surface.

11. The method of claim 10, wherein the rim has at least one piece which forms an annulus.

12. The method of claim 11, wherein the affixing step comprises fusing the rim to the perimeter surface.

13. The method of claim 11, wherein the alloy has a chromium content of approximately 12%.

* * * * *